(12) United States Patent  (10) Patent No.: US 9,190,101 B2
Yamagishi  (45) Date of Patent: Nov. 17, 2015

(54) ARCHIVE DEVICE

(71) Applicant: Hitachi-LG Data Storage, Inc., Tokyo (JP)

(72) Inventor: Hiroshi Yamagishi, Chiba (JP)

(73) Assignee: HITACHI-LG DATA STORAGE, INC., Tokyo (JP)

( * ) Notice: Subject to any disclaimer, the term of this patent is extended or adjusted under 35 U.S.C. 154(b) by 0 days.

(21) Appl. No.: 13/915,894

(22) Filed: Jun. 12, 2013

(65) Prior Publication Data

US 2013/0339989 A1  Dec. 19, 2013

(30) Foreign Application Priority Data

Jun. 13, 2012 (JP) ................................. 2012-133734

(51) Int. Cl.
  *G11B 17/22* (2006.01)
  *G11B 17/022* (2006.01)
  *G11B 33/12* (2006.01)

(52) U.S. Cl.
  CPC ............ *G11B 17/022* (2013.01); *G11B 17/225* (2013.01); *G11B 33/128* (2013.01)

(58) Field of Classification Search
  CPC .. G11B 33/128; G11B 33/08; G11B 33/0405; G11B 33/125; G11B 33/127; G11B 17/022; G11B 17/225
  USPC ............ 720/651, 654, 657; 369/30.46, 30.58, 369/30.73, 30.88; 361/679.33–679.39, 361/679.58
  See application file for complete search history.

(56) References Cited

U.S. PATENT DOCUMENTS

| | | | |
|---|---|---|---|
| 3,145,012 A * | 8/1964 | Kfoury | 248/568 |
| 4,831,476 A * | 5/1989 | Branc et al. | 360/99.15 |
| 6,169,718 B1 * | 1/2001 | Matusi | 720/657 |
| 6,845,006 B2 * | 1/2005 | Kobayashi | 361/679.33 |
| 7,167,360 B2 * | 1/2007 | Inoue et al. | 361/679.34 |
| 7,315,447 B2 * | 1/2008 | Inoue et al. | 361/679.48 |
| 7,345,845 B2 * | 3/2008 | Feliss et al. | 360/97.19 |
| 8,111,514 B2 * | 2/2012 | Imsand | 361/714 |
| 8,215,727 B2 * | 7/2012 | Barrall et al. | 312/223.2 |
| 8,549,912 B2 * | 10/2013 | Merrow et al. | 73/431 |
| 8,570,750 B2 * | 10/2013 | Fang et al. | 361/724 |
| 8,934,223 B2 * | 1/2015 | Chen et al. | 361/679.02 |
| 2003/0043550 A1 | 3/2003 | Ives | |
| 2004/0255313 A1 * | 12/2004 | Kaczeus et al. | 720/651 |
| 2006/0130085 A1 * | 6/2006 | Korikawa | 720/657 |
| 2006/0161936 A1 * | 7/2006 | Permut et al. | 720/657 |

(Continued)

FOREIGN PATENT DOCUMENTS

CN 201025581 Y * 2/2008
CN 201226242 Y * 4/2009

(Continued)

*Primary Examiner* — Will J Klimowicz
(74) *Attorney, Agent, or Firm* — Baker Botts L.L.P.

(57) ABSTRACT

In an archive device which has a disc storing case which stores a plurality of discs, a disc writing/reading unit having an ODD, and a disc conveying unit which conveys each of the discs between both, the fixing strength for a drive fixer to be incorporated to fix the ODD can be increased. The archive device includes holding members which fix surfaces of the ODD in a direction parallel to a direction in which the disc is delivered and received between the disc conveying unit and the ODD, one of the holding members integrally including a detecting member which detects a relative position of the disc storing case with respect to the ODD. The holding members for the surfaces of the ODD may be individual components, and may be integrally formed.

7 Claims, 12 Drawing Sheets

(56) References Cited

U.S. PATENT DOCUMENTS

2006/0212888 A1* 9/2006 Chen .......................... 720/657
2006/0259918 A1* 11/2006 Utz et al. .................... 720/651
2007/0006244 A1* 1/2007 Huang ........................ 720/657
2007/0050795 A1* 3/2007 Pennings et al. ............ 720/651
2010/0287576 A1 11/2010 Terzis et al.
2011/0305132 A1* 12/2011 Merrow et al. ............ 369/263.1
2012/0331493 A1* 12/2012 Kawakami .................. 720/657

FOREIGN PATENT DOCUMENTS

| JP | 06045768 A | * | 2/1994 |
| JP | 7-296481 | | 11/1995 |
| JP | 09282769 A | * | 10/1997 |
| JP | 2012216261 A | * | 11/2012 |
| WO | WO 02103502 A1 | * | 12/2002 |
| WO | WO 2009104282 A1 | * | 8/2009 |

* cited by examiner

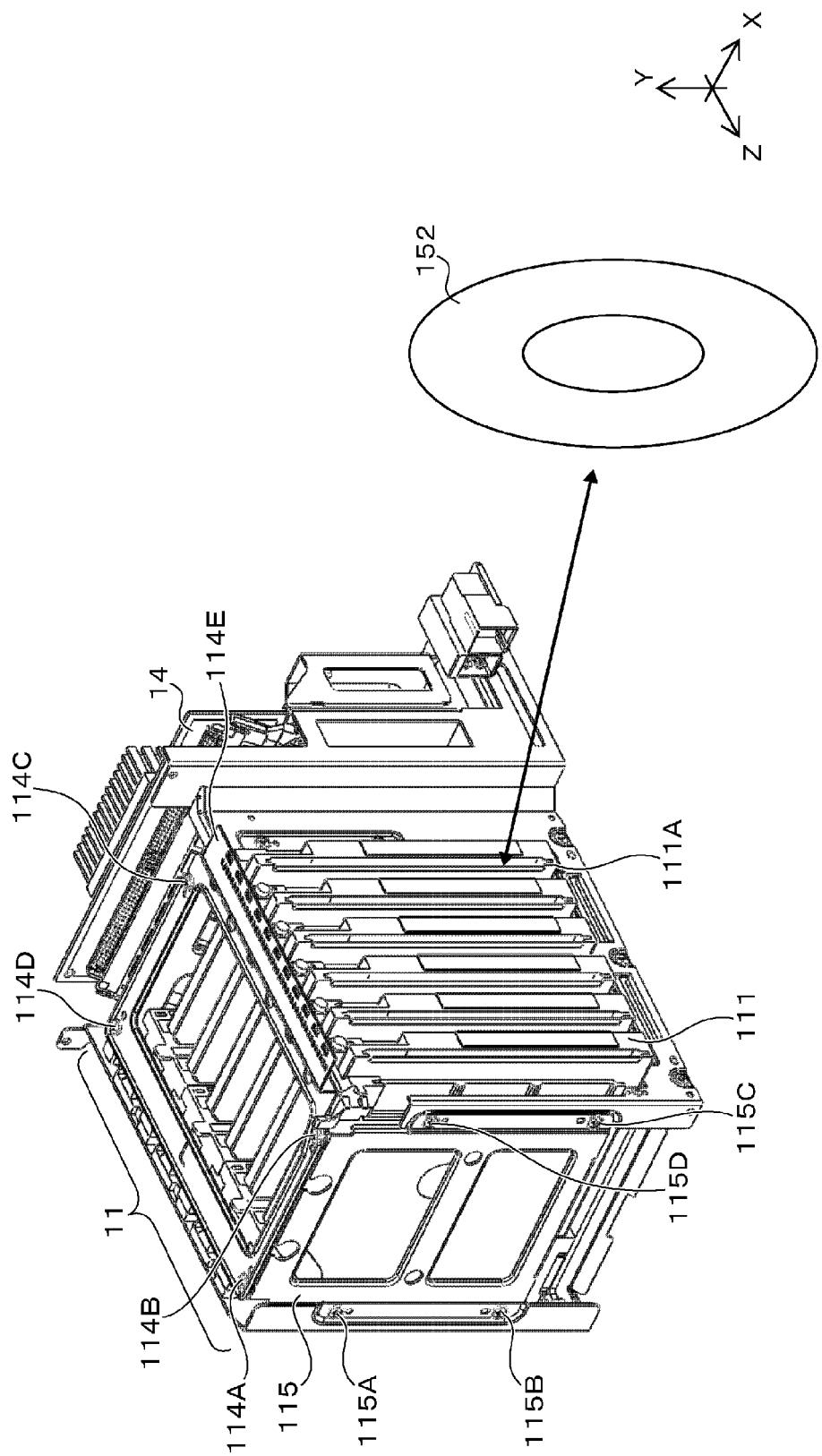

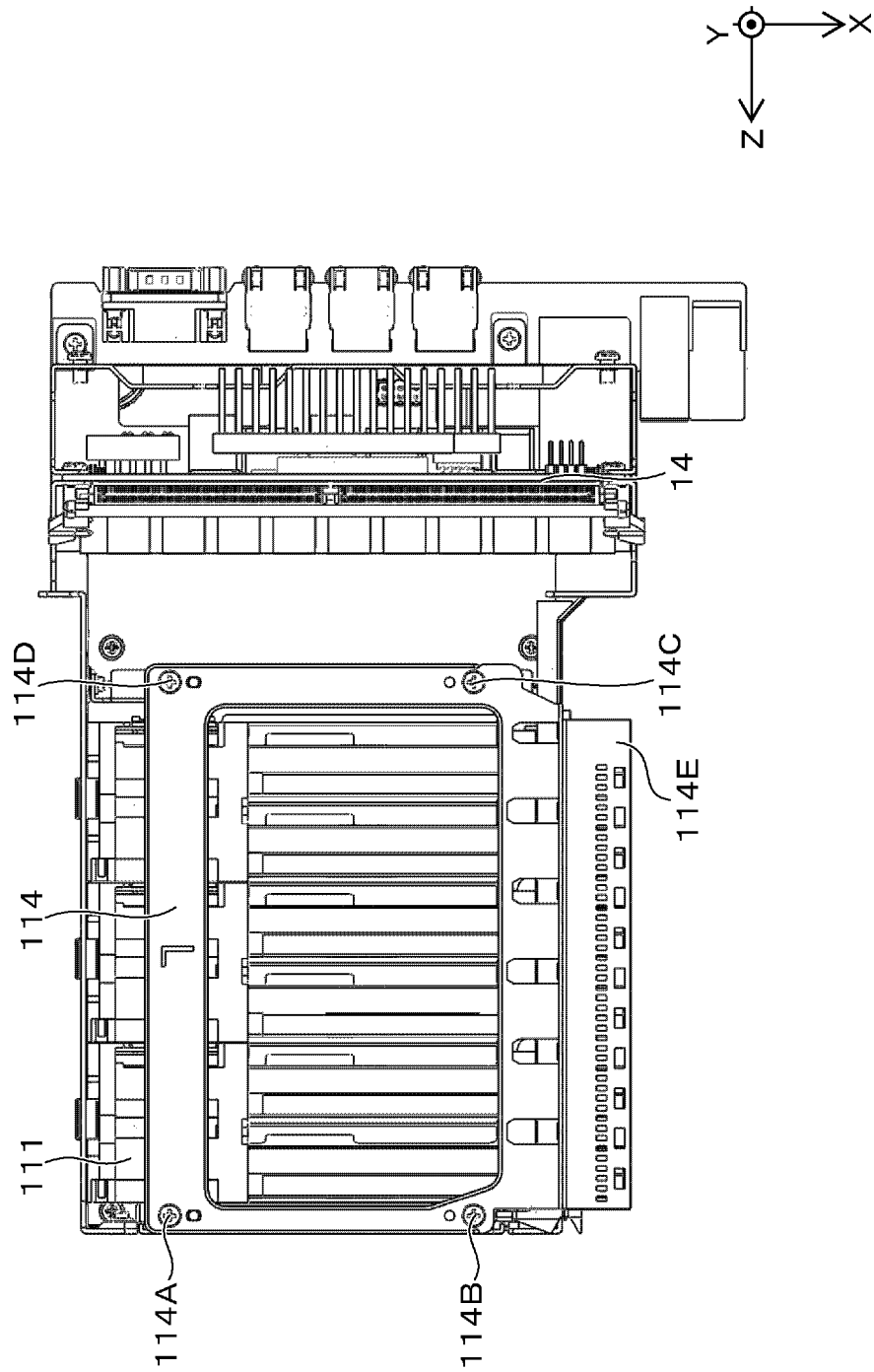

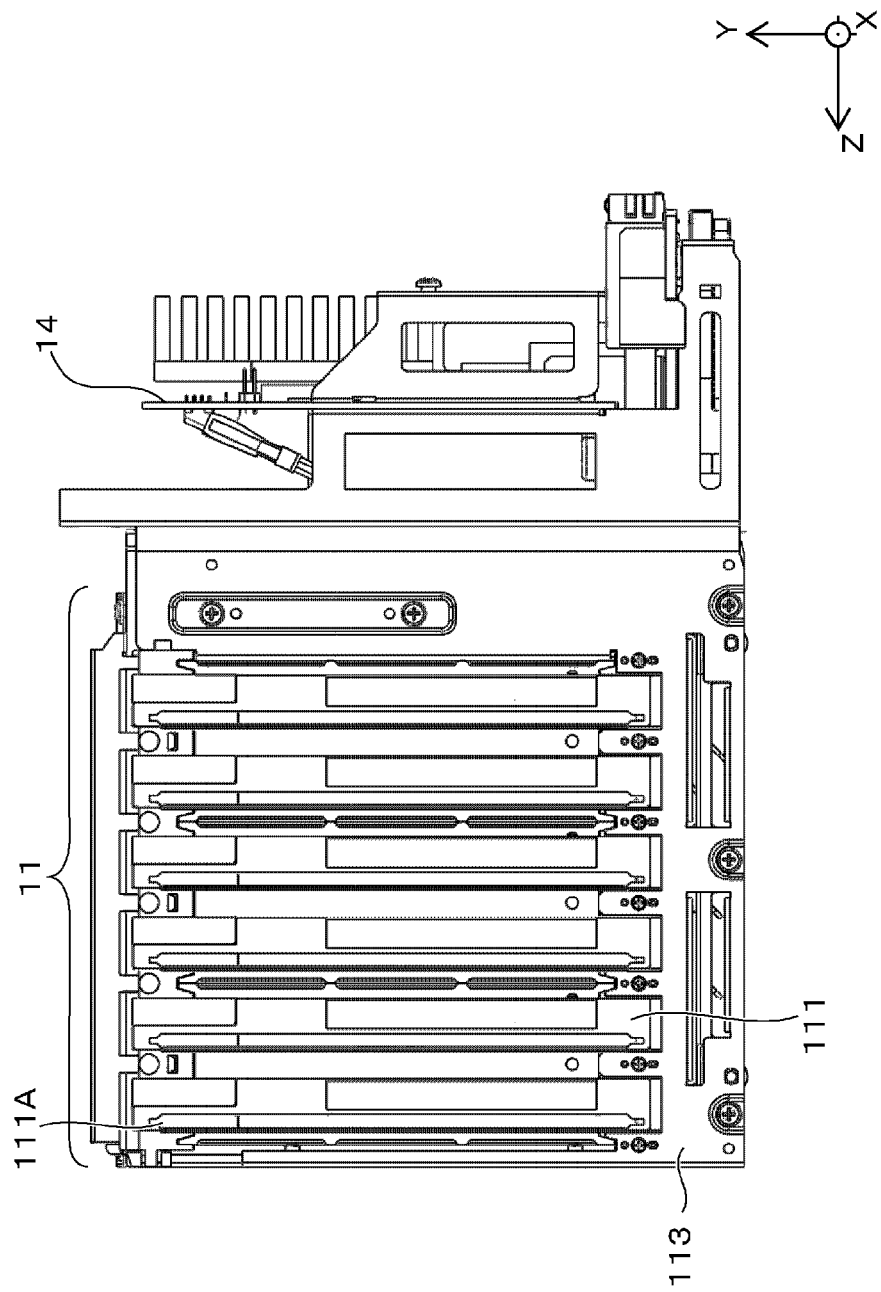

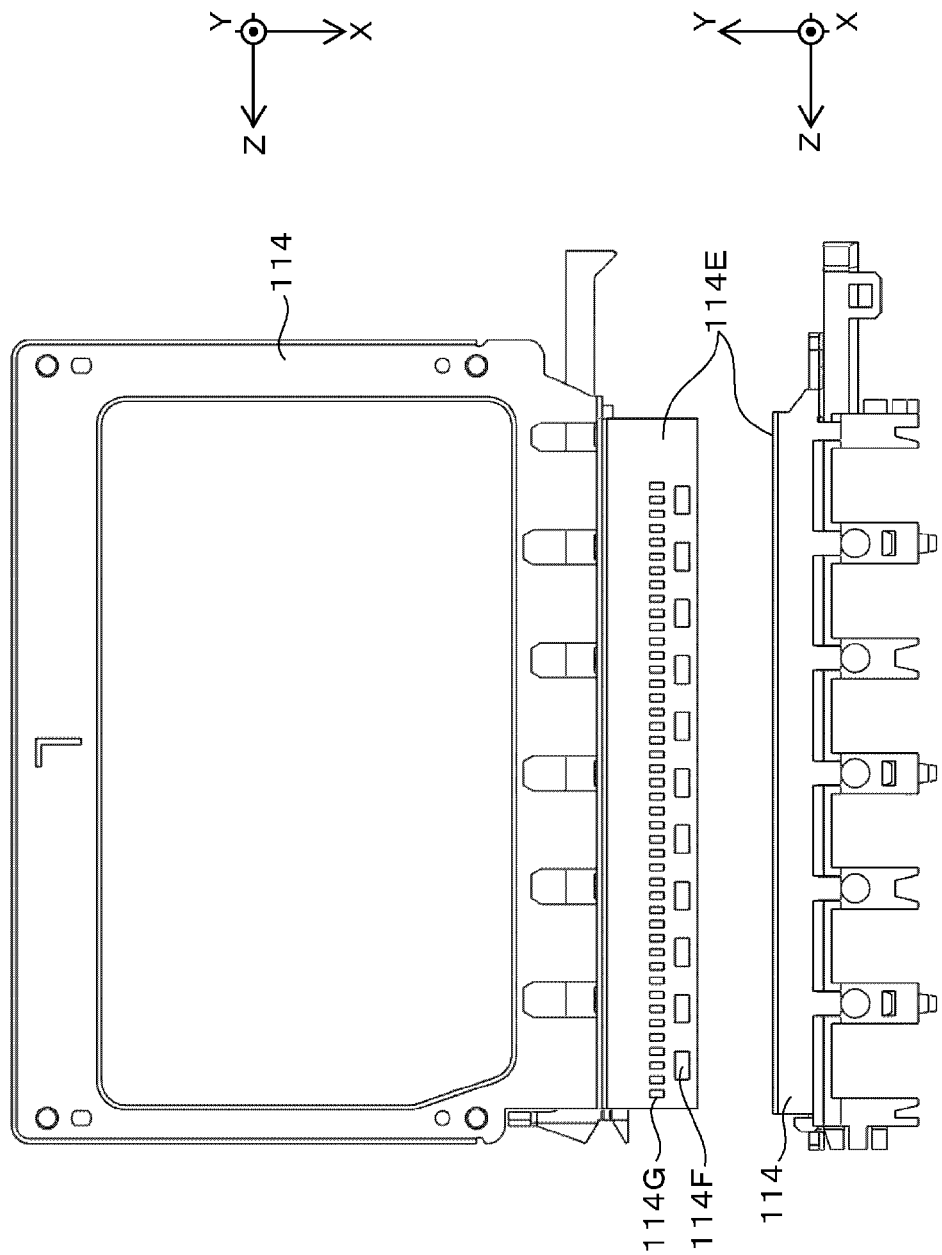

ARCHIVE DEVICE

INCORPORATION BY REFERENCE

This application relates to and claims priority from Japanese Patent Application No. 2012-133734 filed on Jun. 13, 2012, the entire disclosure of which is incorporated herein by reference.

BACKGROUND OF THE INVENTION (1) Field of the Invention

The present invention relates to an archive device. More specifically, the present invention relates to an archive device which can increase the fixing strength of a drive fixer which fixes an optical disc drive (hereinafter, ODD) to be incorporated.

(2) Description of the Related Art

As a device which writes and reads information data, a storage device using an optical disc which is a removable recording medium has been widely used.

The recording capacity of the optical disc has been increased due to the widespread use of Blu-ray discs and the increase of the number of recording layers in recent years. However, many industries including the finance industry need to store large-capacity data over a long period, so that a further increase of the recording capacity has been desired. Therefore, as a large-capacity storage device which is suitable for storing data over a long period, an archive device using the optical disc has been developed.

The archive device includes a storing portion which can store a plurality of optical discs therein, and an ODD. The ODD writes and reads information data to and from the optical discs. Further, the archive device has a conveying mechanism which selects any one of the optical discs stored in the storing portion and inserts the disc into the ODD and removes the disc from the ODD to store the disc into the storing portion.

SUMMARY OF THE INVENTION

In the archive device, when the conveying mechanism takes therein the optical disc stored in the storing portion, conveys the disc, and inserts the disc into the ODD, the following matters are important. For one thing, the ODD needs to be fixed in a predetermined direction without being moved even when the ODD is subjected to shock and vibration. Further, the position of the ODD, in particular, the relative position of the slot in the ODD, which inserts the optical disc thereinto, with respect to the conveying unit needs to be precisely detected. When the ODD which is subjected to shock and vibration is tilted so that the slot is not parallel to the optical disc to be inserted thereinto, or when the relative position of the slot with respect to the conveying unit cannot be precisely detected, the optical disc cannot be inserted into the slot. Even when the optical disc can be inserted into the slot, the recording surface of the optical disc can be damaged.

However, in the conventional archive device, the fixing strength of the drive fixer which fixes the ODD is not sufficient. Consequently, when the ODD is subjected to shock and vibration, the above undesirable state can be caused. Of course, the same problem is also caused when the optical disc is removed from the ODD to return the disc into the storing portion.

In view of the above problems, an object of the present invention is to provide an archive device which can increase the fixing strength for a drive fixer to be incorporated to fix an ODD.

To address the above problems, the present invention provides an archive device which has a disc storing case which stores therein a plurality of discs as recording media, an ODD which writes and reads information data to and from each of the discs, and a disc conveying unit which is moved between the disc storing case and the ODD to convey, deliver, and receive the disc, including the disc conveying unit which delivers and receives the disc into and from the disc storing case with a recording surface thereof directed in a predetermined direction, and delivers and receives the disc into and from the ODD with the recording surface thereof directed in the predetermined direction, and holding members which hold six peripheral surfaces of the ODD.

In addition, the present invention provides the archive device in which the holding member which holds, of the six surfaces of the ODD, a surface orthogonal to the recording surface of the disc which is delivered into and received from the ODD integrally has a position detecting unit which detects a relative position of the disc conveying unit with respect to the ODD, in a direction parallel to a moving direction in which the disc conveying unit is moved between the disc storing case and the ODD.

According to the present invention, the archive device which can increase the fixing strength for the drive fixer to be incorporated to fix the ODD can be provided. Therefore, the basic performance of the archive device can be improved.

BRIEF DESCRIPTION OF THE DRAWINGS

These and other features, objects and advantages of the present invention will become more apparent from the following description when taken in conjunction with the accompanying drawings wherein:

FIG. 6A is an appearance view of the disc writing/reading unit according to the example;

FIG. 6B is a plan view of the disc writing/reading unit according to the example;

FIG. 6C is a side view of the disc writing/reading unit according to the example;

FIG. 8B is a plan view and a front view of the first holding member having the position detecting unit of the disc writing/reading unit according to the example.

DETAILED DESCRIPTION OF THE EMBODIMENT

Hereinafter, an example of the present invention will be described with reference to the drawings. First, the overview of the configuration and operation of an archive device will be described.

As is known, a recording medium used by an ODD is an optical disc which can be removed from a drive. Examples of the optical disc include, e.g., a CD (Compact Disk), a DVD (Digital Versatile Disk), and a BD (Blu-ray Disk). In addition, there are a ROM type optical disc which can only read data (e.g., CD-ROM), an R type optical disc which can write data only once (e.g., BD-R), and an RW, RAM, or RE (e.g., BD-RE) type optical disc which can rewrite data. In this example, the archive device may use all these optical discs, and use some of them.

In the following description, the optical disc is simply referred to as a disc.

Figure 1:
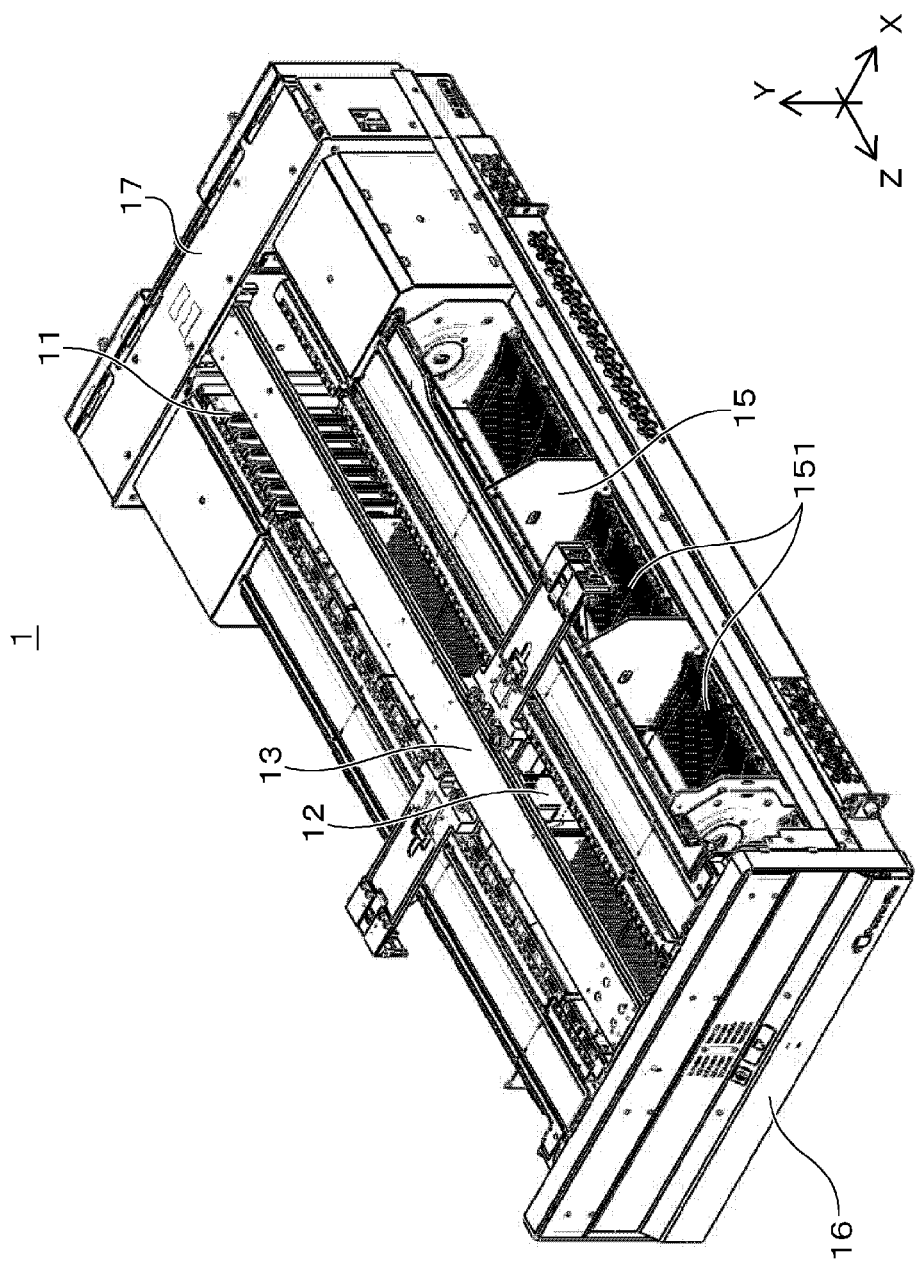
FIG. 1 is an appearance view of an archive device according to an example from the front side thereof.

FIG. 1 is an appearance view of an archive device 1 according to an example from the front side thereof. Here, the outer cover of part of the archive device 1 is removed, and a front panel 16 is seen from the obliquely upper side. To clear the correspondence relation between FIG. 1 and FIG. 2 and thereafter, a three-dimensional axis is shown on the lower right side of FIG. 1. Seeing the front panel 16 from the front side, an X axis is directed from the left side to the right side, and a Y axis is directed from the bottom side to the top side. In addition, a Z axis is directed from a rear panel 17 to the front panel 16.

A disc storing case 15 which can be removed from the archive device 1 corresponds to the disc storing portion. Here, an inside partitioning plate is indicated by the reference numeral of the disc storing case 15. Plural (e.g., several hundred) discs 152, not shown, can be inserted into disc slots 151 on the bottom side of the disc storing case 15. That is, the disc storing case 15 has several hundred disc slots 151. In FIG. 1, by way of example, the discs 152 are inserted to be erected approximately vertically, with their label surfaces and the recording surfaces being opposite each other. Each of the discs 152 is not limited to a single-sided recording disc, and may be a two-sided recording disc.

Here, two disc storing cases 15 are used along the Z axis to sandwich a moving unit 13 of a later-described disc conveying unit therebetween. This is only an example, and one disc storing case may be used. In addition, even when one of the two disc storing cases is attached, the archive device 1 can perform the target operation.

The disc storing cases 15 attached to the archive device 1 each have, on the Z axis, a rear end near a disc writing/reading unit 11, and a front end near the front panel 16. The attaching and detaching methods of the disc storing cases 15 to and from the archive device 1 are not necessary in the description of this example, and are omitted.

Like the disc storing cases 15, two disc writing/reading units 11 are provided on the right and left sides to sandwich the moving unit 13 of the disc conveying unit therebetween. Each of the disc writing/reading units 11 has the ODD as a recording medium drive. The disc writing/reading unit 11 may have one ODD, but may have plural (e.g., several) ODDs to increase the operating speed. As seen from the number of slots indicated in black, here, each of the disc writing/reading units 11 has six ODDs. As is known, each of the ODDs rotates the inserted disc 152 by a spindle motor (not shown) to write and read data using an optical pickup.

A disc conveying unit 12 and the moving unit 13 of the disc conveying unit are components which convey the disc 152 between the disc writing/reading unit 11 and the disc storing case 15. The moving unit 13 of the disc conveying unit uses, e.g., a motor and a gear (although not shown, their positions and shapes are not limited) to move the disc conveying unit 12 in the Z axis direction along a guide member between the vicinity of the front panel 16 and the vicinity of the rear panel 17, as shown.

First, the conveying of the disc 152 from the disc storing case 15 into the disc writing/reading unit 11 will be described.

Based on an instruction from a control unit 14 which is an electric circuit component (although not shown in FIG. 1, the control unit 14 is often located near the rear panel 17), the moving unit 13 of the disc conveying unit moves the disc conveying unit 12 to the position of the slot of the disc storing case 15 which stores therein the disc corresponding to the instruction. The disc moving mechanism, not shown, in the disc conveying unit 12 uses, e.g., a motor and a gear (the disc conveying unit 12 may have them) to insert the disc corresponding to the instruction from the disc storing case 15 into the disc conveying unit 12.

Then, based on the instruction from the control unit 14, the moving unit 13 of the disc conveying unit moves the disc conveying unit 12 to the position of the ODD of the disc writing/reading unit 11 corresponding to the instruction. Further, the disc moving mechanism, not shown, in the disc conveying unit 12 is moved via, e.g., the motor and the gear to move the disc to be conveyed, from the disc conveying unit 12 into the ODD. With this, the disc writing/reading unit 11 can write and read data to and from the conveyed disc.

The component which detects the relative position of the disc conveying unit 12 with respect to each of the ODDs will be described later.

Next, the conveying of the disc 152 from the disc writing/reading unit 11 into the disc storing case 15 will be described.

Based on an instruction from the control unit 14, the moving unit 13 of the disc conveying unit moves the disc conveying unit 12 to the position of the ODD of the disc writing/reading unit 11 which stores the disc corresponding to the instruction therein. The disc moving mechanism, not shown, in the disc conveying unit 12 is then moved via, e.g., the motor and gear to insert the disc corresponding to the instruction from the ODD into the disc conveying unit 12.

Then, based on the instruction from the control unit 14, the moving unit 13 of the disc conveying unit moves the disc conveying unit 12 to the position of the slot 151 of the disc storing case 15 corresponding to the instruction. Further, the disc moving mechanism, not shown, in the disc conveying unit 12 is moved via, e.g., the motor and gear, so that the disc to be conveyed is moved from the disc conveying unit 12 into the disc storing case 15. With this, the disc which has completed the operation in the disc writing/reading unit 11 is stored in the disc storing case 15 again.

The archive device 1 operated as described above can access a large number of discs at high speed, and improve the convenience for the user handling large-capacity data.

When each of the discs stored in the disc storing case 15 on the right side in FIG. 1 is conveyed into the disc writing/reading unit 11 by the disc conveying unit 12, the disc can be inserted into the ODD of the right or left disc writing/reading unit 11. In addition, the disc can be stored in any position of the disc storing case 15. On the contrary, the disc can be fixed in one position. This is determined by an instruction from the control unit 14.

However, in the conventional archive device, the fixing strength of the ODD of the disc writing/reading unit 11 which is subjected to shock and vibration cannot be sufficient. This will be described with reference to FIGS. 2 to 5.

Figure 2:
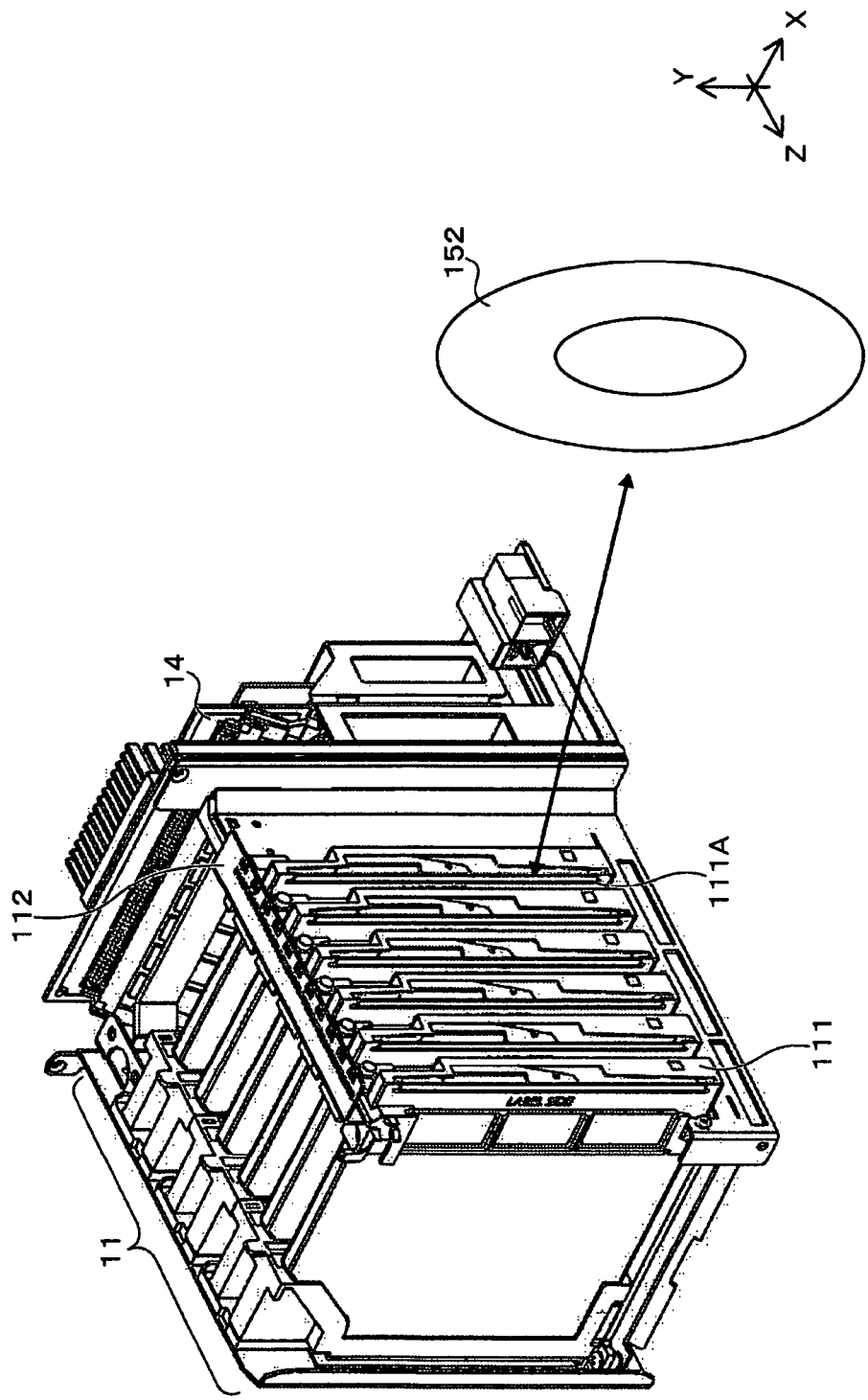
FIG. 2 is an appearance view of a disc writing/reading unit in a conventional example.

FIG. 2 is an appearance view of the disc writing/reading unit 11 in the conventional example, together with the periphery of the control unit 14 in the minus direction of the Z axis with respect to the disc writing/reading unit 11. A large number of electric circuit components including the control unit 14 are mounted on a circuit substrate, and for instance, are attached to near the rear panel 17.

The disc writing/reading unit 11 has, e.g., six ODDs 111 each of which has a slot 111A which inserts and ejects the disc 152 thereinto and therefrom.

Figure 3:
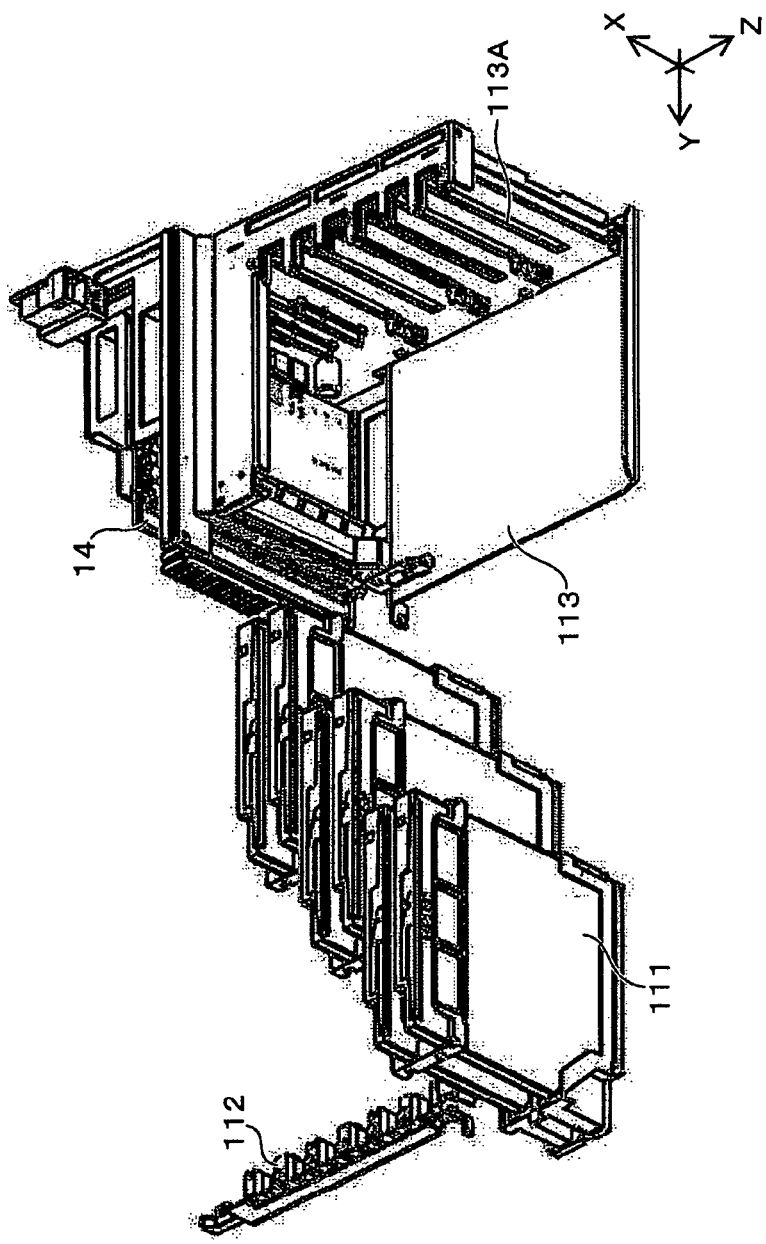
FIG. 3 is an exploded view of the disc writing/reading unit in the conventional example.

FIG. 3 is an exploded view of the disc writing/reading unit 11 in the conventional example. The disc writing/reading unit 11 is rotated 90° in the left direction from FIG. 2. That is, in addition to the ODDs 111, the disc writing/reading unit 11 has a position detecting unit 112 which detects the relative position of the disc conveying unit 12 with respect to each of the ODDs, and a drive fixer 113 which holds the ODDs 111. The drive fixer 113 has a guide 113A which positions the ODDs 111.

Figure 4:
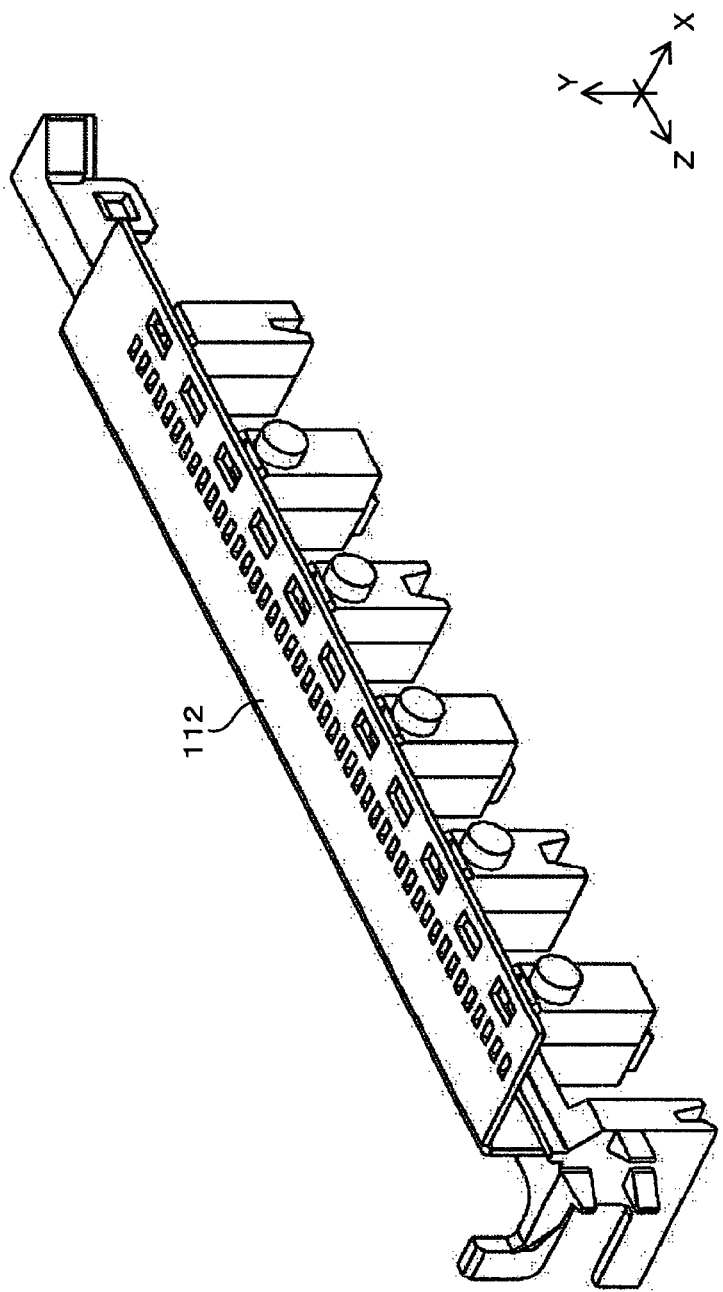
FIG. 4 is an appearance view of a position detecting unit of the disc writing/reading unit in the conventional example.

FIG. 4 is an appearance view of the position detecting unit 112 of the disc writing/reading unit 11 in the conventional example. As shown in FIG. 2, the position detecting unit 112 is located obliquely upward of the slots 111A of the ODDs 111. The position detecting unit 112 is provided between a light generating unit and a detecting unit of the disc conveying unit 12 near each of the ODDs 111. Based on whether or not the detecting unit detects light from the light generating unit, the control unit 14 detects the relative position of the disc conveying unit 12 with respect to the ODD to locate the disc conveying unit 12 in a predetermined position.

Figure 5:
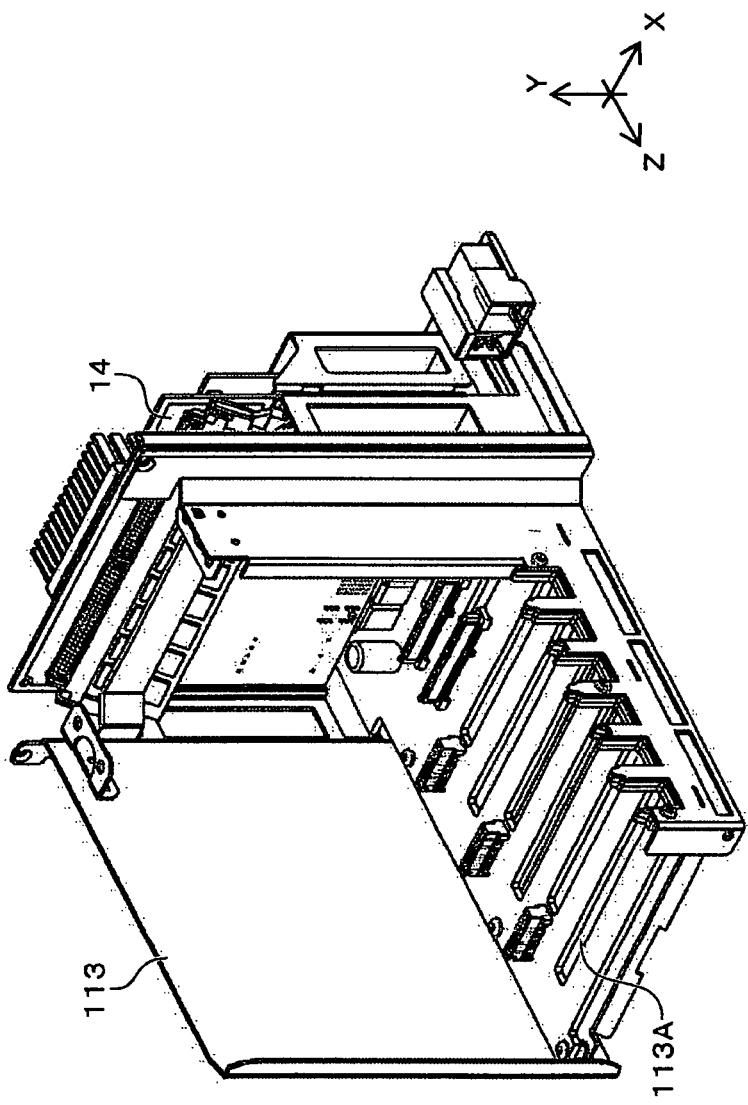
FIG. 5 is an appearance view of a drive fixer of the disc writing/reading unit in the conventional example.

FIG. 5 is an appearance view of the drive fixer 113 of the disc writing/reading unit in the conventional example. Here, the ODDs 111 and the position detecting unit 112 are removed from FIG. 2.

As seen from FIGS. 2 to 5, conventionally, each of the ODDs has a lower side positioned by the guide 113A of the drive fixer 113, and an upper side positioned by the position detecting unit 112. The fixing strength is thus low. In particular, the ODD which is subjected to vibration and shock can be tilted in the Z axis direction, so that the relative position of the position detecting unit 112 with respect to the ODD 111 is shifted. The direction of the slot 111A of the ODD 111 can be tilted with respect to the disc 152 which is erectably inserted thereinto. With this, when the disc 152 is inserted and ejected between the disc conveying unit 12 and the ODD 111, the predetermined operation cannot be performed, and the disc surface can be damaged.

The example which has solved the above problems will be described with reference to FIGS. 6 to 9.

FIG. 6A is an appearance view of the disc writing/reading unit 11 in the example.

FIG. 6B is a plan view of the disc writing/reading unit 11 in the example, as seen in the minus direction of the Y axis from the upper side of FIG. 6A.

FIG. 6C is a side view of the disc writing/reading unit 11 in the example, as seen in the minus direction of the X axis from the slot 111A side of FIG. 6A.

FIGS. 6A to 6C are different from the conventional example shown in FIG. 2 in that a first holding member 114 which is integrally formed with a position detecting unit 114E is provided to fix the upper side of the ODDs 111. In addition, a second holding member 115 is provided to fix the front side in the Z axis direction of the ODD 111. Although not seen in FIG. 6A, a third holding member 116 which is similar to the second holding member 115 is provided to fix the rear side in the Z axis direction of the ODD 111, that is, the side near the rear panel 17. That is, the drive fixer 113 and the first to third holding members 114 to 116 fix the surfaces of the ODDs, which are parallel to the direction (the direction indicated by the arrow in the drawing) in which the disc 152 is moved between the disc conveying unit 12 and the ODD 111.

The first holding member 114 is fixed to the second holding member 115 by means of fixing members 114A and 114B, such as screws. The first holding member 114 is fixed to the third holding member 116 by means of fixing members 114C and 114D, such as screws. The second holding member 115 is fixed to the drive fixer 113 by means of fixing members 115A, 115B, 115C, and 115D, such as screws. The third holding member 116 is fixed to the drive fixer 113 in the same manner. Of course, the number of fixing members which fix each of the holding members is not limited to four, and any number of fixing members may be used as long as the fixing strength can be held.

That is, the drive fixer 113 and the first to third holding members 114 to 116 function together, as a different drive fixer, and fix the ODDs 111 of the disc writing/reading unit 11 from the six peripheral surfaces thereof. With this, even when the archive device 1 is subjected to vibration and shock, each of the ODDs can be prevented from being moved and tilted. With this, the problem of delivering and receiving of the disc 152 between the ODD 111 and the disc conveying unit 12 and the problem of damaging the disc surface can be eliminated.

Although the drive fixer 113 and the first to third holding members 114 to 116 are fixed by means of the fixing members, such as screws, the present invention is not limited to this.

All of these or some of these may be integrally formed.

Further, as shown in FIGS. 6A and 6B, in this example, as one feature, the first holding member 114 is integrally formed with the position detecting unit 114E. With this, the position accuracy of the position detecting unit 114E can be increased, so that the relative position relation between each of the ODDs 111 and the disc conveying unit 12 can be detected at high accuracy.

Figure 7:
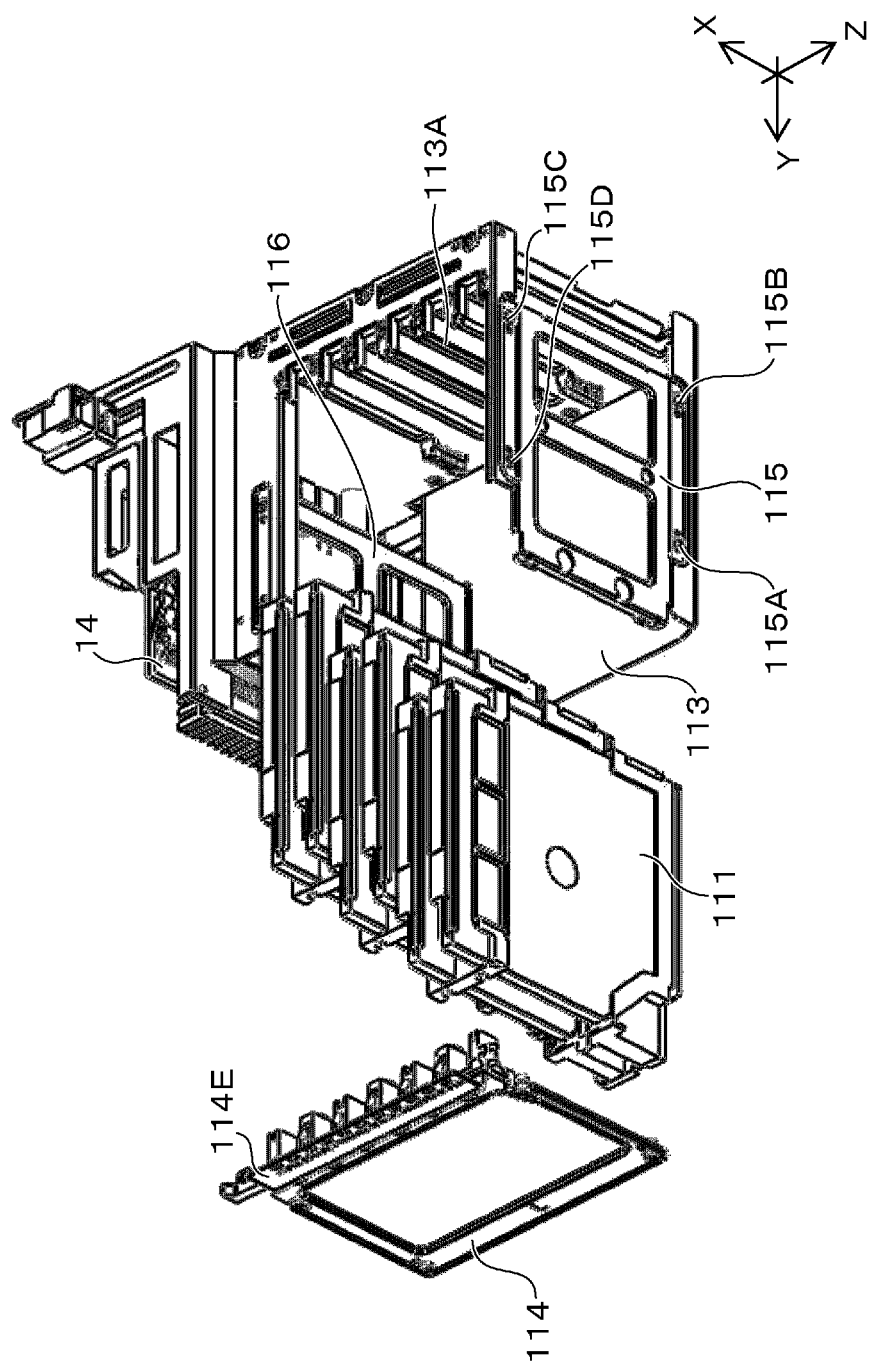
FIG. 7 is an exploded view of the disc writing/reading unit according to the example.

FIG. 7 is an exploded view of the disc writing/reading unit 11 in the example. The disc writing/reading unit 11 is rotated 90° in the left direction from FIG. 6. That is, the disc writing/reading unit 11 has the first to third holding members 114 to 116 fixed to the drive fixer 113. Therefore, the first to third holding members 114 to 116 can increase the fixing strength with respect to the ODDs 111. The drive fixer 113 fixes the first holding member 114 and the third holding member 116, and may have a shape different from the drive fixer 113 shown in FIG. 2. In addition, all of the drive fixer 113 and the first to third holding members 114 to 116 may be considered as one drive fixer.

Figure 8A:
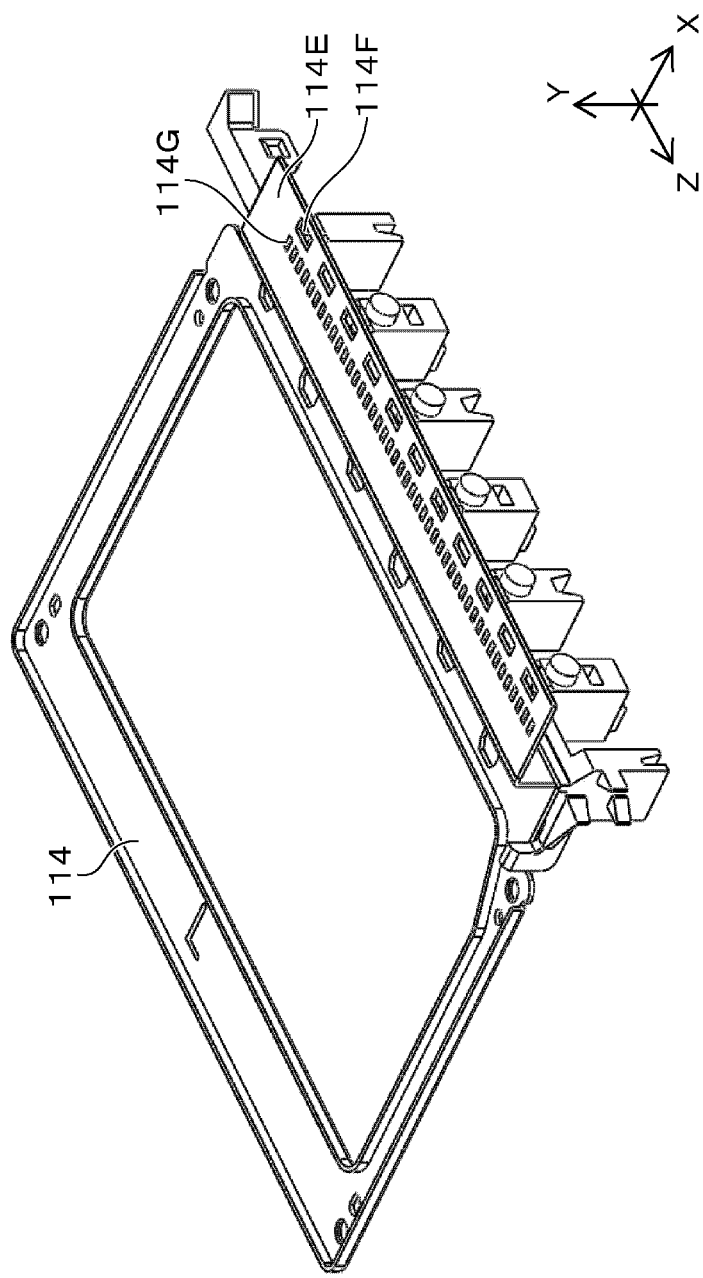
FIG. 8A is an appearance view of a first holding member having a position detecting unit of the disc writing/reading unit according to the example.

FIG. 8A is an appearance view of the first holding member 114 having the position detecting unit 114E of the disc writing/reading unit 11 in the example.

FIG. 8B is a plan view and a front view of the first holding member 114 having the position detecting unit 114E of the disc writing/reading unit 11 in the example, with the plan view as seen in the minus Y direction from the upper side of FIG. 8A and the front view as seen in the minus X direction from the front right side of FIG. 8A.

The position detecting member 114E is integrally formed with the first holding member 114 as part thereof. With this, the relative position relation between each of the ODDs 111 and the disc conveying unit 12 can be detected at high accuracy. To reduce the detecting time for the position relation and to improve the detection accuracy, an example is shown in which the position detecting member 114E includes detection holes 114F with a large size and pitch, and detection holes 114G with a small size and pitch. The detection holes 114F detect the approximate relative position in a short time, and after that, the detection holes 114G detect the relative position at high accuracy in a narrow range.

Figure 9:
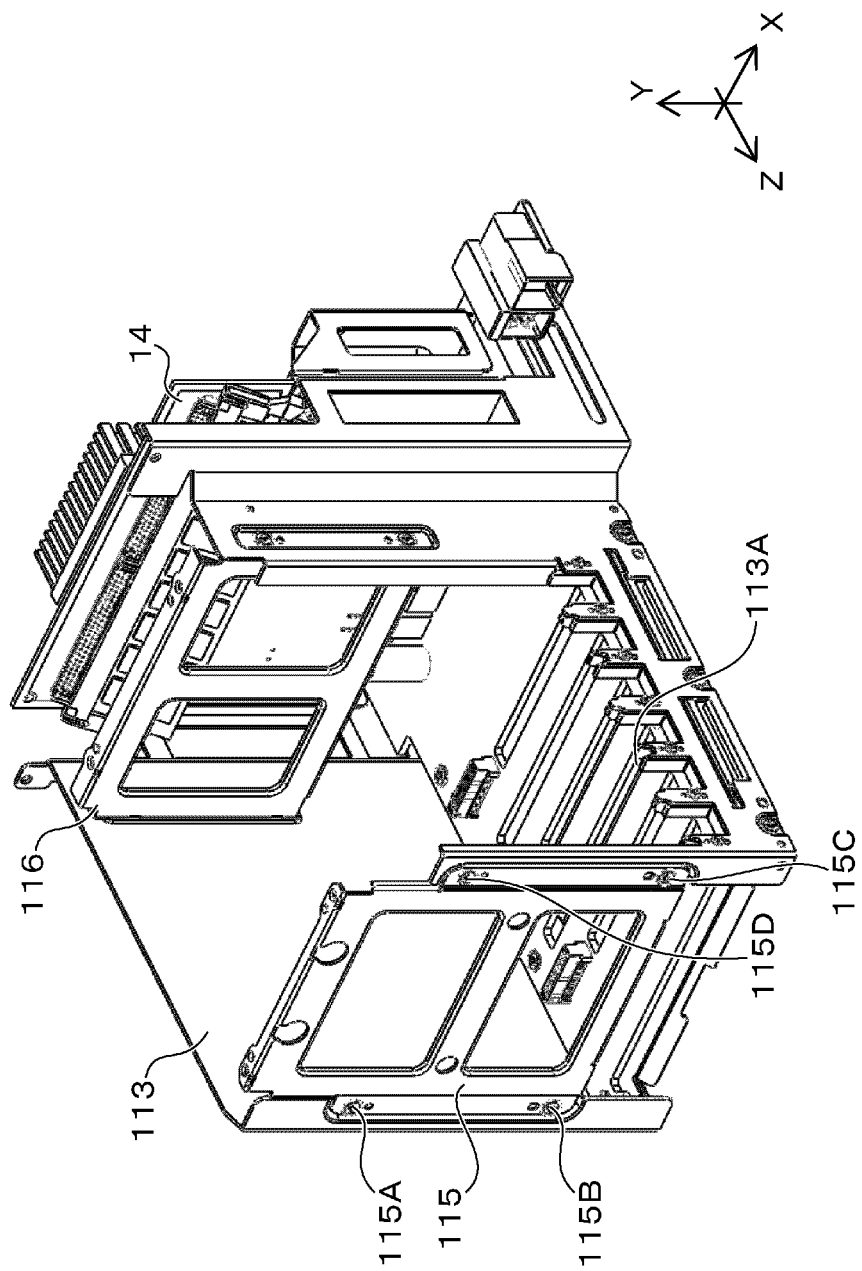
FIG. 9 is an appearance view of the drive fixer of the disc writing/reading unit according to the example.

FIG. 9 is an appearance view of the drive fixer of the disc writing/reading unit 11 in the example. In FIG. 9, the ODDs 111 and the first holding member 114 are removed from FIG. 6. FIG. 9 shows an example of the shape of the third holding member 116. That is, the disc writing/reading unit 11 has the first to third holding members 114 to 116 fixed to the drive fixer 113. Therefore, the first to third holding members 114 to 116 can increase the fixing strength with respect to the ODDs 111.

The above embodiment is only an example, and does not limit the present invention. Different embodiments can be considered based on the purport of the present invention, but any of them is in the scope of the present invention.

While we have shown and described several embodiments in accordance with our invention, it should be understood that disclosed embodiments are susceptible of changes and modifications without departing from the scope of the invention. Therefore, we do not intend to be bound by the details shown and described herein but intend to cover all such changes and modifications that fall within the ambit of the appended claims.

What is claimed is:

1. An archive device which has a disc storing case which stores therein a plurality of discs as recording media, a plurality of optical disc drives (ODDs) which write and read information data to and from each of the discs, and a disc conveying unit which is moved between the disc storing case and an ODD of the plurality of ODDs, to convey, deliver, and receive a disc, the archive device comprising:
   the disc conveying unit which delivers and receives the disc into and from the disc storing case with a recording surface thereof directed in a predetermined direction, and delivers and receives the disc into and from the plurality of ODDs with the recording surface thereof directed in the predetermined direction; and
   holding members which hold six peripheral surfaces of the plurality of ODDs; wherein
   a removable holding member, which is one of the holding members holding the six peripheral surfaces and holds a peripheral surface corresponding to a removable direction of the one or more removable ODDs, is molded integrally with a position detecting unit which detects a relative position of the disc conveying unit with respect to the plurality of ODDs, in a direction parallel to a moving direction in which the disc conveying unit is moved between the disc storing case and the plurality of ODDs; and
   the removable holding member can be removed from the other holding members.

2. The archive device according to claim 1, wherein the position detecting unit has a detection hole which detects the relative position of the disc conveying unit with respect to the plurality of ODDs, the detection hole having first detection holes with a large size and pitch which detect the approximate relative position, and second detection holes with a small size and pitch which detect the relative position in a narrow range.

3. The archive device according to claim 1, wherein when the archive device is provided in a height direction as the predetermined direction, the disc conveying unit delivers and receives the disc into and from the disc storing case so that the recording surface thereof is parallel to the height direction of the archive device, the disc conveying unit delivers and receives the disc into and from the plurality of ODDs so that the recording surface thereof is parallel to the height direction of the archive device, and a direction in which the disc conveying unit is moved between the disc storing case and the plurality of ODDs is parallel to a depth direction of the archive device, and
   wherein the plurality of ODDs has a slot which delivers and receives the disc into and from the disc conveying unit, in parallel with the height direction of the archive device.

4. An archive device which has a disc storing case which stores therein a plurality of discs as recording media, a plurality of optical disc drives (ODDs) which write and read information data to and from each of the discs, and a disc conveying unit which is moved between the disc storing case and an ODD of the plurality of ODDs, to convey, deliver, and receive a disc, the archive device comprising:
   the disc conveying unit which delivers and receives the disc into and from the disc storing case with a recording surface thereof directed in a predetermined direction, and delivers and receives the disc into and from the plurality of ODDs with the recording surface thereof directed in the predetermined direction; and
   holding members which rigidly hold six peripheral side surfaces of the plurality of ODDs; wherein
   a removable holding member, which is one of the holding members holding the six peripheral surfaces and holds a peripheral surface corresponding to a removable direction of the one or more removable ODDs, is molded integrally with a position detecting unit which detects a relative position of the disc conveying unit with respect to the plurality of ODDs, in a direction parallel to a moving direction in which the disc conveying unit is moved between the disc storing case and the plurality of ODDs; and
   the removable holding member can be removed from the other holding members.

5. The archive device according to claim 4, wherein the position detecting unit has a detection hole which detects the relative position of the disc conveying unit with respect to the plurality of ODDs, the detection hole having first detection holes with a large size and pitch which detect the approximate relative position, and second detection holes with a small size and pitch which detect the relative position in a narrow range.

6. The archive device according to claim 4, wherein when the archive device is provided in a height direction as the predetermined direction, the disc conveying unit delivers and receives the disc into and from the disc storing case so that the recording surface thereof is parallel to the height direction of the archive device, the disc conveying unit delivers and receives the disc into and from the plurality of ODDs so that the recording surface thereof is parallel to the height direction of the archive device, and a direction in which the disc conveying unit is moved between the disc storing case and the plurality of ODDs is parallel to a depth direction of the archive device, and
   wherein the plurality of ODDs has a slot which delivers and receives the disc into and from the disc conveying unit, in parallel with the height direction of the archive device.

7. An archive device which has a disc storing case which stores therein a plurality of discs as recording media, a plurality of optical disk drives (ODDs) which write and read information data to and from each of the discs, and a disc conveying unit which is moved between the disc storing case and an ODD of the plurality of ODDs, to convey, deliver, and receive a disc, the archive device comprising:
   the disc conveying unit which delivers and receives the disc into and from the disc storing case with a recording surface thereof directed in a predetermined direction, and delivers and receives the disc into and from the plurality of ODDs with the recording surface thereof directed in the predetermined direction; and
   holding members which hold a plurality of peripheral surfaces of the plurality of ODDs; wherein
   a removable holding member, which is one of the holding members holding the plurality of peripheral surfaces and holds a peripheral surface corresponding to a removable direction of the plurality of ODDs, is molded integrally with a position detecting unit which detects a relative position of the disc conveying unit with respect to the plurality of ODDs, in a direction parallel to moving direction in which the disc conveying unit is moved between the disc storing case and the plurality of ODDs; and the removable holding member can be removed from the other holding members.

* * * * *